United States Patent Office 3,447,877
Patented June 3, 1969

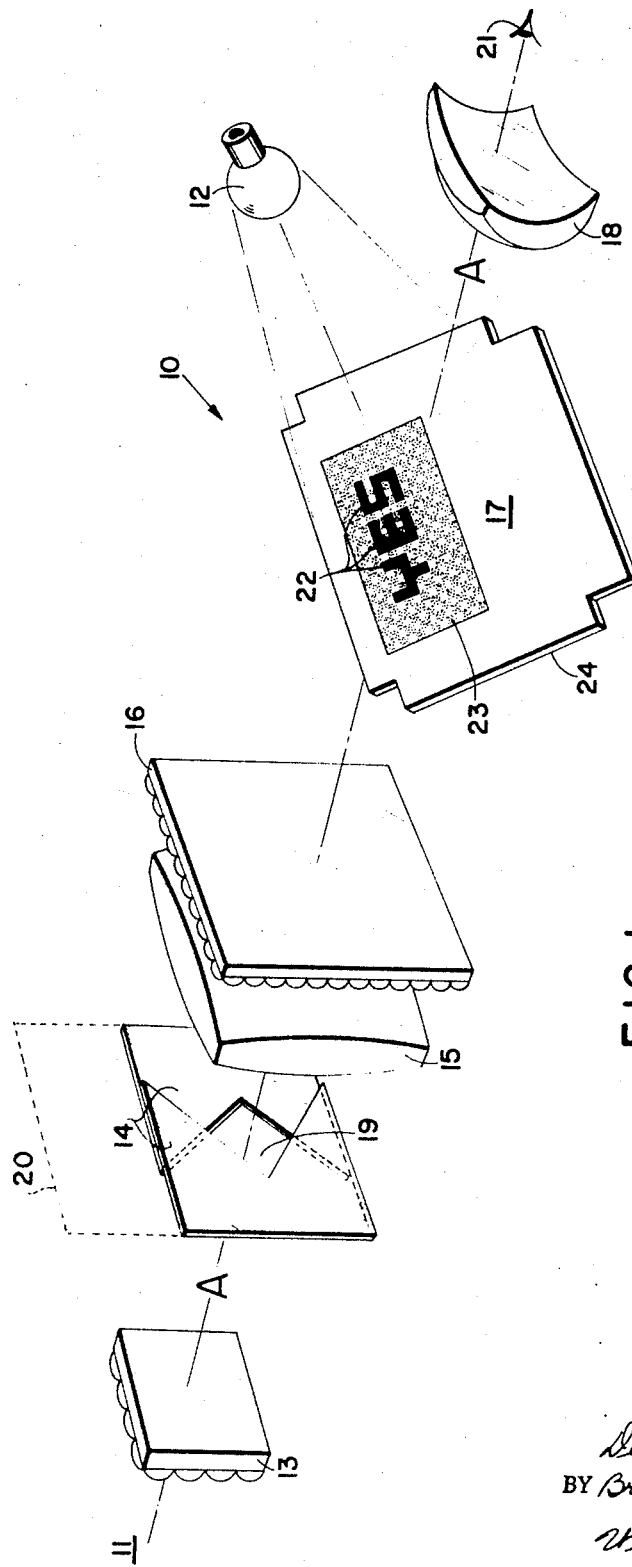

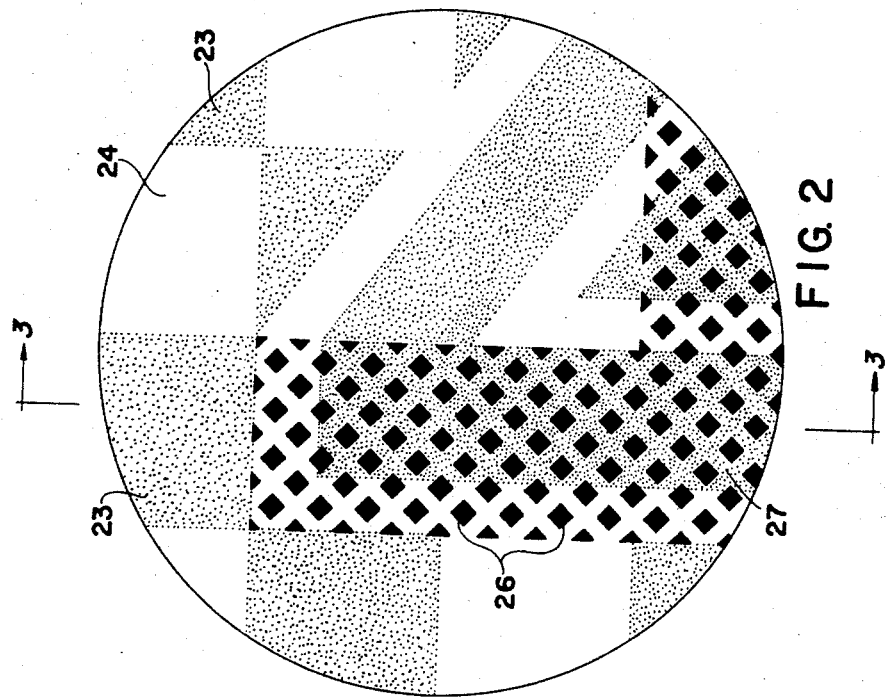
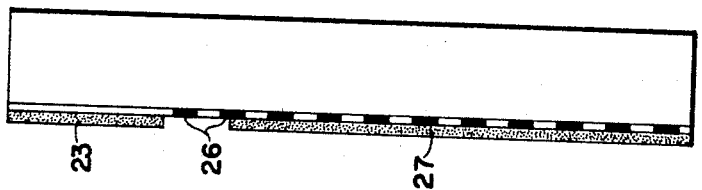

3,447,877
COMPARISON PHOTOMETER HAVING SUPERPOSED SEPARATELY INTELLIGIBLE INDICIA
Dexter P. Cooper, Jr., Lexington, Mass., assignor to Polaroid Corporation, Cambridge, Mass., a corporation of Delaware
Filed May 26, 1965, Ser. No. 458,879
Int. Cl. G01j 1/12, 1/40
U.S. Cl. 356—230                                 8 Claims

ABSTRACT OF THE DISCLOSURE

A comparison photometer has two separate information-bearing index symbols, e.g. "yes" and "no," each of which occupies the same visible region. These symbols are capable of being made selectively intelligible each to the exclusion of the other, by adjustments of the relative amounts of light received from two light sources being compared. Because the two symbols are superimposed on and substantially coextensive with each other, the precision of photometric balance is improved. The secondary symbol which is clearly visible at all conditions of light imbalance dominates the primary symbol except at zero balance when it disappears merging into a substantially uniform field. Thereupon the primary symbol snaps into view sharply differentiated from its background, dominating and camouflaging the secondary symbol.

---

This invention relates to comparison photometers of the type providing a positive visual indication to an observer when photometric balance is achieved.

Conventional comparison photometers involve bringing a light source of unknown brightness into a common field of view with a light source of known and controllable brightness. When the sources are photometrically unbalanced, light and dark areas are defined, the boundary between which is sharp and easily discernible. At balance, the field appears uniformly bright and the boundary between the areas disappears. Thus, the precise point of interest is marked by the disappearance of a pattern defined by contrasting levels of brightness. While such disappearance indicates photometric balance, it is a negative indication apparent to an observer only because he knows that imbalance in one direction produces a pattern of light and dark areas that reverses on passing through balance. For obvious reasons, it would be highly desirable to provide a positive indication to an observer that balance has been achieved.

Certain types of apparatus capable of presenting to an observer an intelligible pattern in contrasting levels of brightness when the brightness of the two sources has a predetermined relationship (e.g., equality), are disclosed and claimed in copending application Ser. No. 359,116, filed Apr. 13, 1964, now U.S. Patent No. 3,323,431, issued June 6, 1967, which is the sole invention of Edwin H. Land, and in copending application Ser. No. 359,113, filed Apr. 13, 1964, now U.S. Patent No. 3,368,447, issued February 13, 1968, which is the joint invention of Edwin H. Land and Dexter P. Cooper, Jr.

The basic invention of the first of these two copending applications involves the viewing of light from each of two independent uniformly illuminated source areas in a common field through the means of a visible pattern-creating medium or screen providing the effect of registered, separately illuminated and complementary patterns. The configuration of the composite pattern thus formed is dependent, not only on the configuration of the pattern-creating medium, but on the polarity and magnitude of the photometric balance or imbalance existing between the brightnesses of the two source areas. Where the magnitude of the imbalance is sensibly zero, the brightnesses of the source areas are substantially equal. By using properly designed fixed patterns, the composite pattern defines a preselected configuration or index at substantially one and only one given value of photometric balance. Moreover, a visual indication that such value of balance has been reached is provided when the index becomes uniquely intelligible at balance, but becomes concealed or camouflaged and made unintelligible when a change in the balance produces a changed visible configuration. The patterns or screens thus cause an index to be intelligible only at photometric balance and provide a positive indication to an observer that photometric balance has been reached.

The invention described and claimed in the second of the above-identified copending patent applications, an improvement on the first, involves the use of a single reflecting pattern, which partially covers a background area and is illuminated by one source of light. The background area is illuminated by another source of light and can be seen through the interstices of the pattern. Thus, an observer sees light from the one source reflected from the pattern and light from the other source transmitted through the interstices of the pattern. When the background area seen through the interstices of the reflecting pattern appears to an observer as bright as the reflecting pattern, that is at photometric balance, the latter disappears and the field becomes uniformly illuminated. When the background area seen through the interstices of the reflecting pattern is brighter than the reflecting pattern, the latter appears dark against the visible elements of the background; and when the background is less bright than the reflecting pattern, the latter appears light against the visible elements of the background. By interposing in the field of view, a transparent support containing an index symbol rendered visible in terms of a low average density tone, the observer sees the index symbol in registration with the pattern. When the pattern is visible at photometric imbalance, the index symbol is also somewhat visible but is not intelligible due to the confusing nature of the pattern.

The present invention has as a principal object to provide a comparison photometer of the general type described, wherein the precision of the light balance achieved is improved by an arrangement which accelerates the concealment and effective disappearance of the uniquely intelligible indicia with but slight departures from the balanced light condition.

A further object of the invention is the provision of such a photometer with an improved high precision comparison screen and selectively viewable indicia which may be employed with great accuracy in the determination of balanced light conditions.

This invention, an improvement over each of the inventions described in the aforesaid patent applications, contemplates the formation of two separate index symbols, one superimposed directly upon and substantially coextensive with the other, but so formed that each symbol becomes separately and selectively intelligible to the user. When either one of the symbols is apparent and intelligible, it dominates, obscures and conceals the intelligibility or legibility of the other. In a preferred embodiment the primary index symbol employed for indicating photometric balance, and which becomes uniquely intelligible only at balance, is formed photographically in a gelatine emulsion as a minute pattern of optically dense dots separated on a transparent substrate by clear surrounding areas.

An open pattern incorporating a secondary index symbol and formed in a reflective pigment is applied to the substrate with its indicia superimposed directly on the first symbol. The secondary indica which is clearly visible at all conditions of light imbalance dominates the first symbol except at zero balance, i.e., equality, when it disappears, merging into a substantially uniform field, whereupon the primary symbol snaps into view sharply differentiated from its background, dominating and camouflaging the secondary symbol which merges into a substantially uniform field.

The background pattern and the two superimposed sets of indicia are illuminated on one side by one source of light and on the other by a second source. The user varies the ratio between the intensities of the two sources and observes the substrate together with its separate sets of indicia from the direcion of the first-applied indicia.

Although the scope of the invention is not to be limited except by fair and reasonable interpretation of the claims appended hereto, further details of the invention as well as additional objects and advantages thereof are set forth and will be more apparent in connection with the following detailed description taken in connection with the accompanying drawings wherein:

FIGURE 1 is a schematic perspective of a photometer constructed according to the present invention;

FIG. 2 is a much enlarged plan view of a small portion of the photometer target shown in FIGURE 1 illustrating certain characteristics of the patterns and indicia formed thereon;

FIG. 3 is a cross sectional view through the target screen taken on lines 3—3 of FIGURE 2;

Figure 4:
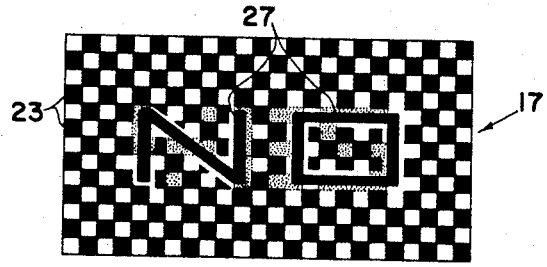
FIG. 4 is a plan view of the photometer target screen as seen by a user illustrating its appearance when the light from the scene is brighter than the light from the reference light.

Referring now to FIGURE 1, reference numeral 10 designates a comparison photometer utilizing a light comparison target constructed in accordance with the present invention. Photometer 10 is used in connection with two independent sources of light denoted at 11 and 12, termed scene source and reference source respectively. The elements of the illustrated structure include field lens 13, variable diaphragm means 14, collecting lens 15, diffuser 16, target 17 and eyepiece 18 in addition to lamp 12. The field of the photometer is determined by lens 13 which may be in the form of a transparent support on one surface of which are a plurality of lenticulations. Light passing through lens 13 is incident on diaphragm means 14 which may be conventional and is shown as two reciprocably mounted plates contoured at their overlying edges to define a photometer aperture 19.

Mechanical coupling 20 between the two plates permits an operator to impart relative sliding movement between the plates and thus selectively to control the size of aperture 19 thereby controlling the amount of light incident on lens 15 and diffuser 16. Diffuser 16 may be constituted by a transparent support, one surface of which is specially treated, for example, by embossing lenticules thereon, to cause incident light to be scattered on transmission through the support so that observer 21 would view diffuser 16, in the absence of the target 17, as a first source of light that defines a background area of substantially uniform llumination functionally related to the average brightness of the scene source. Details of the photometer such as lens, etc., are not germane to this disclosure, it being understood that source 11 illuminates a diffuse, substantially uniform background area, whose brightness is selectively controllable by adjustable diaphragm 14.

Target 17 is interposed between the observer and source 11, and in its form shown in FIGURE 1, comprises a main transparent support 24 on which is provided a primary index symbol 22 superimposed upon a reflective discontinuous screen 23 defined by areas of opaque white material that diffusely reflects light from source 12 into the eye of observer 13. Thus, the observer sees the substantially uniform light from source 11 through the interstices of screen 23, and in the same field, sees the screen 23 substantially uniformly illuminated by source 12. When the background area is brighter than the screen 23, the latter appears to observer 21 as being dark against a light background; and when the background area is less bright than the screen 23, the latter appears to observer 21 as being bright against a dark background.

In other words, there is an inversion in the apparent screen brightness on passing through photometric balance. At that condition, which is established by selective adjustment of diaphragm means 14, the screen 23 and the interstices between the discrete areas of the screen are equally bright and the observer sees a uniformly illuminated field in which the screen 23 can no longer be clearly discerned. This is the ideal situation when each reflective area of the screen has exactly the same quality, reflecting exactly the same amount of light and is uniformly diffuse. Actually, it is difficult to produce this condition without considerable effort in creating the screen on the support. Hence, in practical embodiments, there are regions in the field of view of the observer when the screen structure is faintly discernible even at photometric balance.

In the preferred form of the invention, the primary indicium 22 contained on target 17 is the index symbol "yes," while screen 23 is a regular checkerboard array with certain areas arranged to form a secondary index symbol "no" superimposed on the primary index symbol. However, any other index symbols could be used, and the screen could be irregular or random. The essential feature with regard to the screen is that its secondary index symbol must itself camouflage the primary index symbol 22 except under the conditions noted below. For reasons explained below, an important characteristic of the medium forming the primary index symbol 22 is that it have reflective and light attenuating properties distinguishable from those of the screen 23 when each is uniformly illuminated. This is best accomplished by rendering the primary index symbol in a low average density tone darker than that of the background pattern. There may suitably be employed for this purpose a continuous-tone partially attenuating symbol of a type particularly described in the abovementioned copending U.S. application, Ser. No. 359,113. However, the primary index symbol is even more advantageously formed in a manner described in another copending U.S. application of Conrad H. Biber and Jeremy M. Topaz, Ser. No. 410,977, filed Nov. 13, 1964. According to the latter disclosure, the index symbol 22 is defined, not by continuous regions that partially absorb incident light, but by discontinuous areas that absorb substantially all of the light incident thereon so that light incident on the interstices between the areas passes therethrough unattenuated.

Thus, in the portions of the primary index symbol overlying the interstices of the screen, a predetermined percentage of background light is permitted to reach the observer. In the portions of the symbol overlying the screen itself, the same percentage of light is permitted to be reflected back to the observer with the result that all portions of the primary index symbol appear equally bright or equally dark at photometric balance. A desirable way to construct such a photometer target is to photograph the primary index symbol 22 through a suitable finely patterned grid on a sensitive emulsion coating applied to one side of a transparent base. Upon development, a transparency will result with a fine dot pattern thereon comprising a plurality of substantially totally absorbing separate areas that define the primary index symbol 22. It should be understood that a dot pattern wherein the dots are contained inside the envelope of the primary index symbol is fully equivalent to providing the dots outside the envelope of the index symbol.

Having obtained a transparency in this manner, the next step is preferably to deposit the reflective screen including its secondary index symbol in opaque white ink or paint directly over the emulsion side of the transparency using a standard printing or silk screening process. The resultant target might have a configuration such as that represented in the enlarged incremental views of FIGS. 2 and 3, wherein the primary index symbol 22 is constituted by a minute pattern of opaque black dots 26 arranged in diagonal rows at approximately 45° to the horizontal with clear areas therebetween. These black dots are incorporated within the emulsion which is directly on one surface of the transparent film base 24. The patterned white screen 23 including its integral secondary index symbol 27 is superimposed directly on the emulsion on the opposite side from the observer.

In order to prevent the totally absorbent dots from casting a shadow on the white reflective pattern due to illumination by lamp 12 which is skewed relative to the line of sight, the thickness of layer should be kept as small as possible. Such a shadow might distort the appearance of the primary index symbol in the region where it overlies the reflective screen. Consequently, the light-sensitive emulsion which constitutes a layer should be as thin as possible, the thickness shown in FIG. 3 exaggerated for ease in illustrating the invention.

The comparison target 17 thus comprises a primary index symbol 22 rendered in a low average density tone superimposed directly upon a secondary index symbol 27 forming an integral part of the discontinuous reflective screen 23. The primary and secondary index symbols in this embodiment are represented by the words "yes" and "no" respectively, although any other complementary letters or groups of letters or any intelligence-bearing indicia are intended to be included in the term "index symbol."

Figure 5:
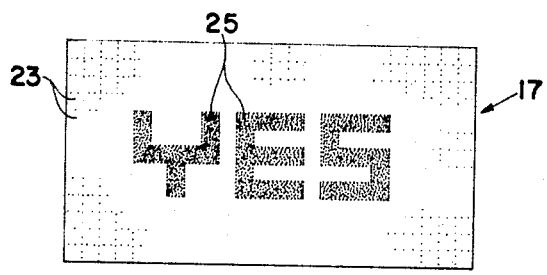
FIG. 5 is a view similar to FIG. 4 illustrating the appearance of the target screen at photometric balance between the two light sources.
Figure 6:
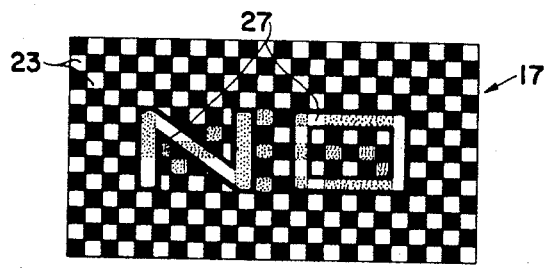
FIG. 6 is a view similar to FIG. 4 illustrating the appearance of the target screen when the light from the scene is less bright than the reference light.

The three possible photometric relationships between sources 11 and 12 are: screen 23 less bright than the background; screen 23 equally as bright as the background; and screen 23 brighter than the background. The view seen by observer in each of these three relationships is shown in FIGS. 4, 5 and 6, respectively. It should be noted that the primary index symbol 22 is intelligible only in FIG. 5 because the entire background against which the symbol is seen is uniformly bright, while in FIGS. 4 and 6, the primary index symbol while somewhat visible, is camouflaged and unintelligible due to the dominant character of the secondary index symbol on the background against which the primary index symbol exists.

As shown in FIG. 4, screen 23 appears dark against a light background when the light from diffuser 16 passing through the interstices of the screen is brighter than the light from source 12 reflected from the screen. In such case, the secondary index symbol "no" is apparent to an observer and the primary index symbol 22, while visible, is not intelligible.

When diaphragm means 14 attenuates the light from source 11 to the extent that the light from diffuser 16 passing through the interstices of the screen is less bright than the light from source 12 reflected from the element, the screen appears bright against a dark background. Again, as seen in FIG. 6, the index symbol "no" is apparent and the primary index symbol is camouflaged. It is to be noted however that the character of the separate areas which represent the screen and its background is reversed. Those areas which were bright in FIG. 4 are dark in FIG. 6 and vice versa.

At some intermediate adjustment of diaphragm 14, the brightness of light passing through the interstices of the reflective screen equals the brightness of light reflected by the pattern, i.e., at photometric balance, and the prominent features of the screen disappear from view as the entire field becomes uniformly illuminated, except for the primary index symbol "yes" which then becomes uniquely and sharply intelligible as in FIG. 5. The primary index symbol then appears to be less bright than the background due to its attenuation of light therefrom. Since they eye responds readily to minor variations in brightness between adjacent areas, even a slight degree of photometric imbalance causes the patterned screen and the secondary index symbol, against which the primary index symbol is superimposed, to become apparent to the observer. Thus, the term "uniquely intelligible" refers to a situation where the primary index symbol is seen against a uniformly illuminated background, or one that does not suggest a dominant pattern or secondary index symbol.

The position of diaphragm means 14, at which aperture 19 is of such size that the index symbol becomes uniquely intelligible, is functionally related to the average brightness of scene 11 if the brightness of lamp 12 is kept fixed. Thus, the position of the diaphragm means can be calibrated in terms of average scene brightness permitting the disclosed apparatus to function as an exposure meter. Alternatively, the apparatus could be directly incorporated into a camera when the position of the diaphragm is used to establish the exposure value of the shutter mechanism of the camera.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:
1. A comparison photometer target comprising:
 (a) a screen of reflective areas separated by light transmissive areas, said reflective and transmissive areas being arranged to form a secondary information-bearing index symbol,
 (b) partially light transmissive means defining a primary information-bearing index symbol superimposed upon and substantially coextensive with said secondary index symbol and rendered in a medium having reflective properties different from those of the reflective areas of said screen,
 (c) whereby said primary index symbol dominates and camouflages said secondary index symbol when the brightness of said reflective areas is substantially equal to the brightness of light passing through said transmissive areas, and said secondary index symbol dominates and camouflages said primary index symbol when the brightness of said areas is unequal.
2. A comparison photometer target comprising:
 (a) a screen of reflective areas separated by light transmissive areas, said reflective and transmissive areas being arranged to form a secondary information-bearing index symbol,
 (b) means defining a primary information-bearing index symbol superimposed upon and substantially coextensive with said secondary index symbol and rendered in a low average density tone,
 (c) whereby said primary index symbol dominates and camouflages said secondary index symbol when the brightness of said reflective areas is substantially equal to the brightness of light passing through said transmissive areas, and said secondary index symbol dominates and camouflages said primary index symbol when the brightness of said areas is unequal.
3. In a comparison photometer, the combination of:
 (a) a first light source defining a background area of substantially uniform illumination,
 (b) means defining a discontinuous reflective screen partially covering said background area with the reflective areas of said screen arranged to form a secondary information-bearing index symbol,
 (c) partially light transmissive means defining a primary information-bearing index symbol superimposed upon and substantially coextensive with the secondary index symbol of said screen and rendered in a medium having a different reflectance than that of said reflective screen, (d) a second light source for illuminating said screen and said index symbols, (e) said index symbols being arranged so that the primary index symbol is uniquely intelligible obscuring and camouflaging said secondary index symbol only when the level of brightness of said background area and the level of brightness of said screen are substantially equal, and said secondary index symbol becomes intelligible obscuring and camouflaging said primary index symbol whenever the levels of brightness of said background area and said screen are unequal.

4. A comparison photometer comprising:

(a) a first light source defining a background area of substantially uniform illumination, (b) a transparent support extending across said background area, (c) partially light transmissive means on said support defining a primary information-bearing index symbol rendered in a medium having predetermined properties of reflectance and light attenuation, (d) a screen of discontinuous reflective and light transmissive areas interposed between said primary index symbol and said background area, said reflective areas having reflective properties different from those of said primary index symbol medium and being arranged to form a secondary information-bearing index symbol occupying substantially the same area as said primary index symbol and partially covering said background area, and (e) a second light source for illuminating said screen and said index symbols, (f) whereby said primary index symbol is uniquely intelligible only when the level of brightness of said background area and the level of brightness of said screen are substantially equal, and said secondary index symbol becomes intelligible and obscures and camouflages said primary index symbol whenever the levels of brightness of said background area and said reflective screen areas are unequal.

5. A comparison photometer comprising, in combination:

(a) a first light source defining a background area of substantially uniform illumination, (b) means defining a discontinuous reflective screen partially covering said background area with the reflective areas arranged to define a secondary information-bearing index symbol, (c) means defining a primary information-bearing index symbol rendered in a low average density tone superimposed upon and substantially coextensive with the secondary index symbol of said screen, and (d) a second light source for illuminating said screen and said index symbols, (e) said index symbols being arranged so that the primary index symbol is uniquely intelligible only when the level of brightness of said background area and the level of brightness of said screen are substantially equal, and said secondary index symbol becomes intelligible and obscures and camouflages said primary index symbol whenever the levels of brightness of said background area and said screen are unequal.

6. A comparison photometer comprising, in combination:

(a) a first light source defining a background area of substantially uniform illumination, (b) target means defining a discontinuous reflective screen arranged to form a secondary information-bearing index symbol partially covering said background area, and a primary information-bearing index symbol rendered in a low average density tone superimposed on and substantially coextensive with said secondary index symbol, (c) a second light source for illuminating said pattern and index symbols, (d) said index symbols being arranged so that said primary index symbol is uniquely intelligible only when the level of brightness of said background area is substantially equal to the level of brightness of said screen, and said secondary index symbol dominates and camouflages said primary index symbol at all other relationships between the level of brightness of said background area and the level of brightness of said screen.

7. A comparison photometer comprising:

(a) a first light source defining a background area of substantially uniform illumination, (b) a transparent support extending across said background area, (c) means on said support defining a primary information-bearing index symbol rendered in a low average density tone, (d) a discontinuous reflective screen carried by said support between said primary index symbol and said background area and arranged to form a secondary information-bearing index symbol substantially coextensive with said primary index symbol and partially covering said background area, (e) a second light source for illuminating said screen and said index symbols, and (f) said index symbols being arranged so that the primary index symbol is uniquely intelligible only when the level of brightness of said background area and the level of brightness of said screen are substantially equal, and said secondary index symbol becomes intelligible and obscures and camouflages said primary index symbol whenever the levels of brightness of said background area and said reflective screen are unequal.

8. A comparison photometer comprising:

(a) comparison means for presenting for visual inspection intermixed areas separately illuminated with light from separate light sources, said areas being arranged to form a secondary information-bearing index symbol; and (b) partially light transmissive means defining a primary information-bearing index symbol superimposed upon and substantially coextensive with said secondary index symbol, said symbol defining means being rendered in a medium having different light attenuating properties than those of said comparison means, whereby said primary index symbol dominates and camouflages said secondary index symbol when the brightnesses of said areas are substantially equal and said secondary index symbol dominates and camouflages said primary index symbol when the brightnesses of said areas are unequal.

References Cited

UNITED STATES PATENTS 3,323,431   6/1967   Land _____ 88—23 X
3,368,447   2/1968   Land et al. _____ 88—23

JEWELL H. PEDERSEN, *Primary Examiner.*

WARREN A. SKLAR, *Assistant Examiner.*

U.S. Cl. X.R.

356—233